United States Patent
Fruth et al.

(10) Patent No.: US 8,075,814 B2
(45) Date of Patent: Dec. 13, 2011

(54) DEVICE FOR LAYERWISE MANUFACTURING OF A THREE-DIMENSIONAL OBJECT

(75) Inventors: Albert Fruth, München (DE); Hans Perret, München (DE)

(73) Assignee: EOS GmbH Electro Optical Systems, Krailling (DE)

( * ) Notice: Subject to any disclaimer, the term of this patent is extended or adjusted under 35 U.S.C. 154(b) by 0 days.

(21) Appl. No.: 11/630,950

(22) PCT Filed: May 22, 2006

(86) PCT No.: PCT/EP2006/004849
§ 371 (c)(1),
(2), (4) Date: May 20, 2009

(87) PCT Pub. No.: WO2007/009526
PCT Pub. Date: Jan. 25, 2007

(65) Prior Publication Data
US 2009/0295039 A1 Dec. 3, 2009

(30) Foreign Application Priority Data
Jul. 21, 2005 (DE) .................... 10 2005 034 155

(51) Int. Cl.
*B28B 7/04* (2006.01)
(52) U.S. Cl. ....... 264/39; 264/1.36; 425/174.4; 425/375
(58) Field of Classification Search ............. 425/174.4, 425/375; 264/1.36, 39
See application file for complete search history.

(56) References Cited

U.S. PATENT DOCUMENTS

| | | | | |
|---|---|---|---|---|
| 3,158,828 A | * | 11/1964 | Bargen | 338/28 |
| 3,495,259 A | | 2/1970 | Rocholl et al. | |
| 3,789,191 A | * | 1/1974 | Spindler | 338/24 |
| 4,754,149 A | * | 6/1988 | Wang | 250/573 |
| 4,845,344 A | | 7/1989 | Price et al. | |
| 5,766,741 A | * | 6/1998 | Kawakami et al. | 428/210 |
| 5,837,960 A | | 11/1998 | Lewis et al. | |
| 5,876,767 A | * | 3/1999 | Mattes et al. | 425/174.4 |
| 6,367,415 B2 | * | 4/2002 | Kim et al. | 118/723 E |
| 6,583,379 B1 | | 6/2003 | Meiners et al. | |

FOREIGN PATENT DOCUMENTS

| | | |
|---|---|---|
| EP | 0 785 838 B1 | 5/1999 |
| JP | 03 033 812 | 2/1991 |
| JP | 10-166461 | 6/1998 |

* cited by examiner

*Primary Examiner* — Joseph Del Sole
*Assistant Examiner* — David N Brown, II
(74) *Attorney, Agent, or Firm* — McDonnell Boehnen Hulbert & Berghoff LLP

(57) ABSTRACT

An apparatus for layerwise manufacturing of a three-dimensional object by solidification of a material, which can be solidified via electromagnetic radiation, includes a source for the electromagnetic radiation, a building space for manufacturing the three-dimensional object, a coupling window, for transmitting the electromagnetic radiation into the building space and a heating element for heating the coupling window. By the heating element the temperature of the lens is increased during the building of the three-dimensional object. By the increased temperature the accumulation of contamination on the coupling window is prevented.

29 Claims, 4 Drawing Sheets

DEVICE FOR LAYERWISE MANUFACTURING OF A THREE-DIMENSIONAL OBJECT

BACKGROUND OF THE INVENTION

The present invention is related to a device for layerwise manufacturing of a three-dimensional object.

Such devices are known in the prior art for example as devices for stereolithography, laser sintering etc.

Thus, for example a device for layerwise manufacturing of an object by laser sintering is known to the applicant, which has a support for positioning of the object relative to a work surface and a device for applying a powder that can be solidified by electromagnetic radiation. The apparatus comprises a laser. The laser beam that has been generated by the laser is focussed via lenses onto a spot within the work surface by a focussing device and solidifies the powder. In particular, when using plastics as powder material, volatile decomposition and reaction products escape from the powder in the process, which deposit on the lens and thus more and more reduce the transparency of the lens in the course of the manufacturing process. This leads to the situation that the laser beam is less and less transmitted, whereby its intensity in the work surface decreases. Due to the decreasing intensity the quality of the object to be manufactured degrades. In order to avoid this situation, a safety glass is placed in front of the lens, the safety glass being blown with nitrogen from several nozzles. However, as the nitrogen only partially overflows over the safety glass and as no flow is present between the nozzles, at these positions the contaminations deposit. Therefore, the safety glass has to be removed and cleaned after each building process.

In order to solve this problem EP 0 785 838 proposes a device, wherein the focussing device comprises an annular nozzle adjacent to the surface of the lens that is facing the work surface, which with its output side is directed towards the surface of the lens in such a way that an escaping flow tangentially runs along the surface of the lens towards the centre and which at the input side is connected to a source of a gas under pressure as e.g. nitrogen in such a way, that it can be disconnected.

OBJECT OF THE INVENTION

Therefore, the problem of providing an apparatus for layerwise manufacturing of a three-dimensional object, which effectively prevents a contamination of a coupling window that serves for transmitting electromagnetic radiation to the work surface, forms the basis of the present invention.

SUMMARY OF THE INVENTION

The problem is solved by an apparatus and methods recited in the claims.

In this apparatus a heating element is provided for a coupling window for the electromagnetic radiation in order to raise the temperature of the lens during the building of the three-dimensional object. Due to the increased temperature an accumulation of contaminations on the coupling window is avoided.

According to the invention a method for layerwise manufacturing of a three-dimensional object by solidification of a material, which can be solidified by electromagnetic radiation, comprises the steps of providing a building space serving for the manufacturing of said three-dimensional object, providing a source for emitting said electromagnetic radiation, providing a coupling window for transmitting said electromagnetic radiation into said building space, and heating of said coupling window during the layerwise manufacturing of said three-dimensional object.

BRIEF DESCRIPTION OF THE DRAWINGS

Further features and the further usefulness of the invention will unfold from the description of embodiments on the basis of the accompanying drawings, of which.

DESCRIPTION OF PREFERRED EMBODIMENTS

Referring to FIG. 1 to 4 in the following an apparatus for layerwise manufacturing of a three-dimensional object according to a first embodiment of the present invention is described.

Figure 1:
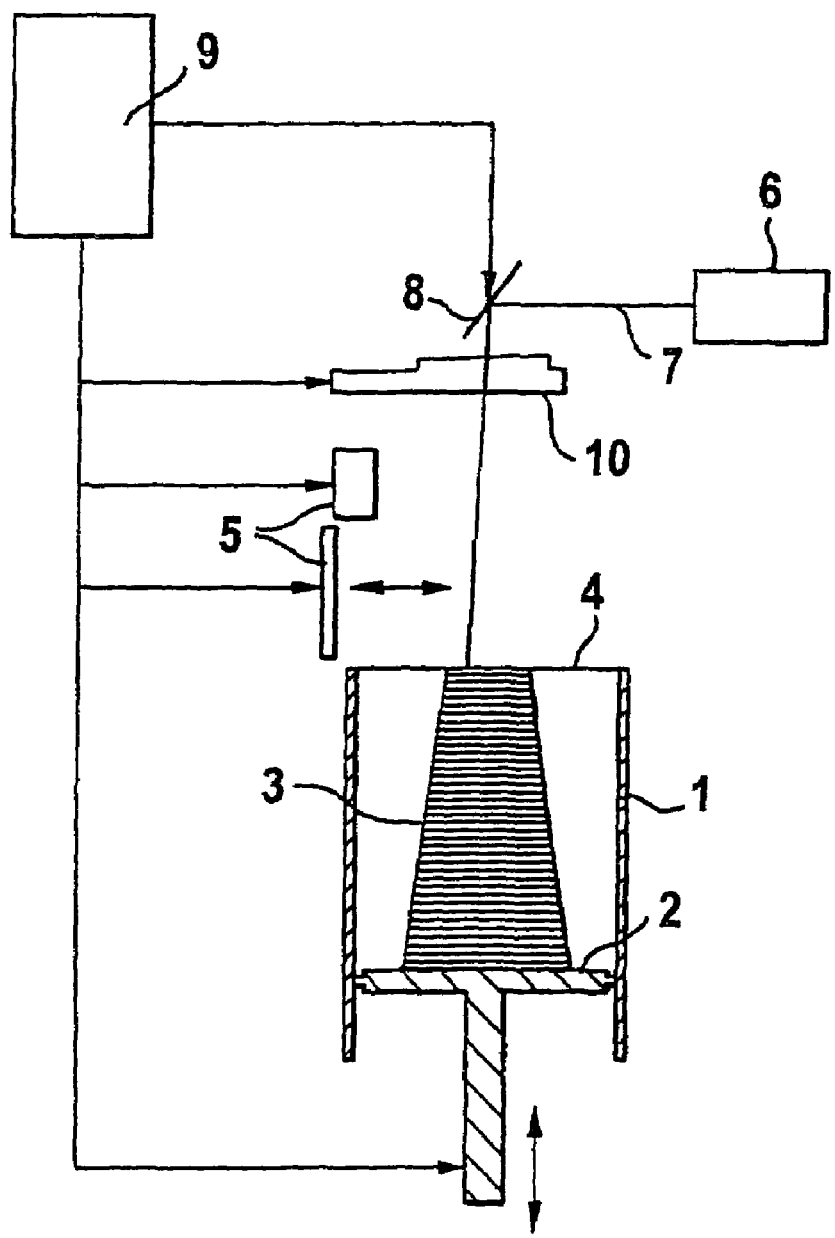
FIG. 1 is a schematic block diagram of an embodiment of an apparatus for layerwise manufacturing of a three-dimensional object.

As can be seen in FIG. 1, the apparatus for layerwise manufacturing of an object comprises a container 1 that is open at the top. A support 2, which is movable in a vertical direction and supports the object 3 to be formed, is placed in this container 1. The support 2 is positioned in the vertical direction such that the layer of the object 3 to be solidified in each case lies within a working plane 4. Further, an application device 5 for applying the building material in powder form that can be solidified by electromagnetic radiation is provided. The apparatus comprises a laser 6. The laser beam 7, which is generated by the laser 6, is deflected by a deflecting device 8 that is controlled by a control device 9 and is focussed at a predetermined point within the working plane 4 by a focussing device 10.

The area of the apparatus, in which the object 3 is built is generally termed "building space".

Figure 2:
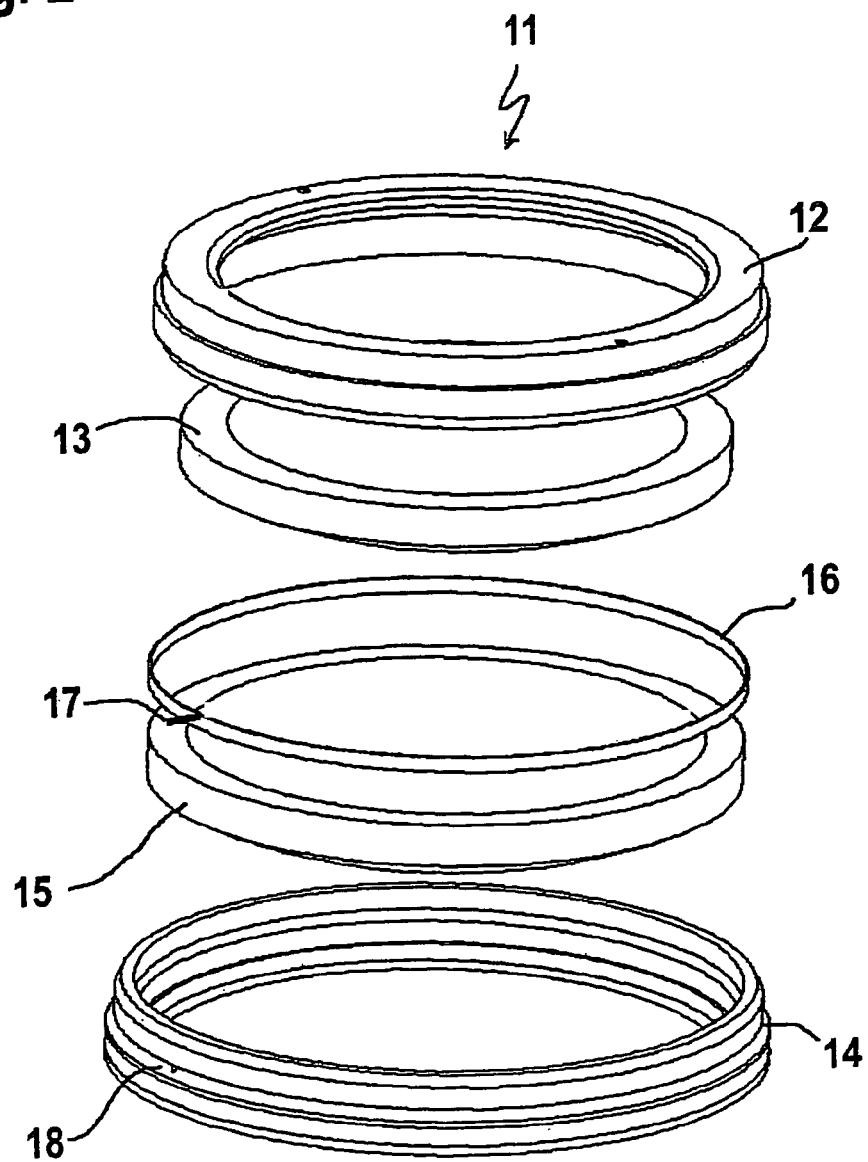
FIG. 2 is an exploded view of a lens module included in the apparatus of FIG. 1.
Figure 3:
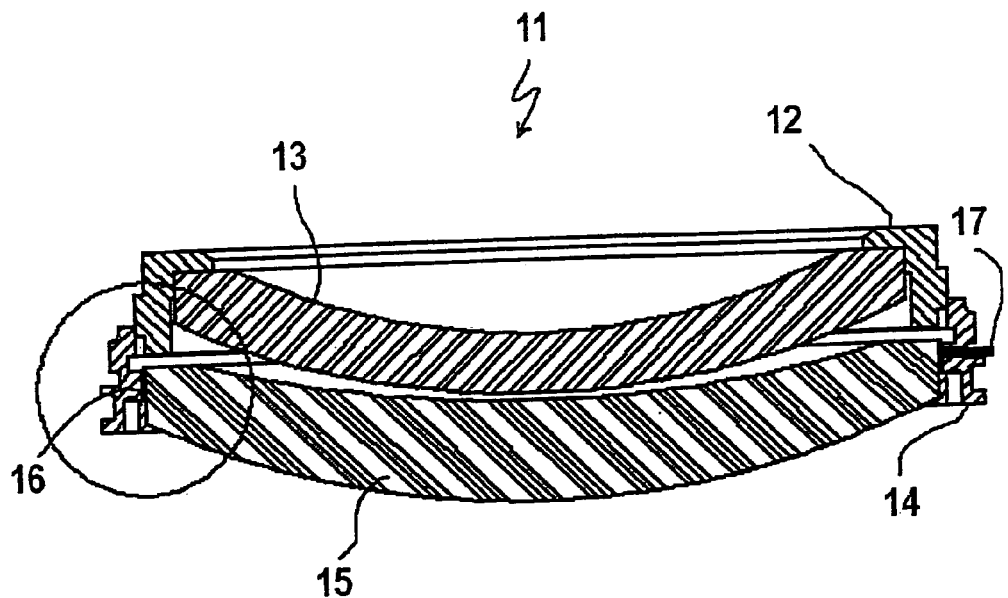
FIG. 3 is a cross-sectional view of the lens module of FIG. 2.
Figure 4:
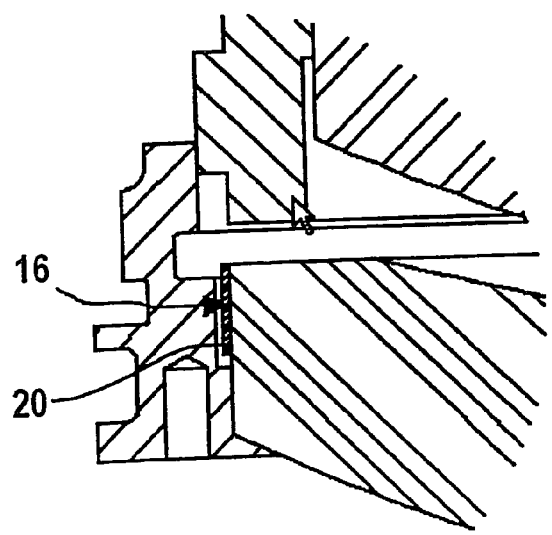
FIG. 4 is a detail of the cross-sectional view of FIG. 3.

The focussing device 10 contains a lens module 11, which is an example of a coupling window, and which is shown in more detail in FIGS. 2 and 3.

The lens module 11 includes a retaining ring 12, an entry lens 13, which is held in the retaining ring 12 and through which the laser beam 7 enters the lens module 11, a lens mount 14 fitted onto the retaining ring 12 at the side facing the working plane 7 and an exit lens 15, which is held by the lens mount 14 and through which the laser beam 7 exits the lens module 11.

For the exit lens 15, which is arranged at the side of the lens module facing the working plane 7 and therefore is exposed to the danger of contamination, a heating element 16 is provided, which is arranged around the rim of the exit lens 15. The heating element 16 includes electrical leads 17 which are led out of the lens module 11 through a cut 18 in the lens mount 14.

In the present embodiment this heating element 16 comprises a wire coiling 20.

In the following an example is described for the formation of the heating element 16 and its attachment to the exit lens 15.

From a copper wire insulated with lacquer having a thickness of for example 0.1 mm a wire coiling 20 is formed in a shape corresponding to the outer diameter of the exit lens and is connected to a connecting material as e.g. an epoxy resin such as to form a unit. The heating element 16 thus formed is subsequently bonded onto a cylindrical outer rim of the exit lens. The ends of the wire of the wire coiling 20 are led out of the lens module 11 as electrical leads 17 through the cut 18 in the lens mount 14.

When operating the apparatus for layerwise manufacturing of a three-dimensional object an electric energy is supplied to the electric leads 17, the electric energy being transformed into heat by the wire coiling 20. This heat is dissipated to the exit lens 15 such that the temperature of the latter rises. By the temperature rise of the exit lens 15, e.g. up to more than approximately 100°, a contamination of the exit lens 15 by precipitates is remarkably lowered.

Figure 5:
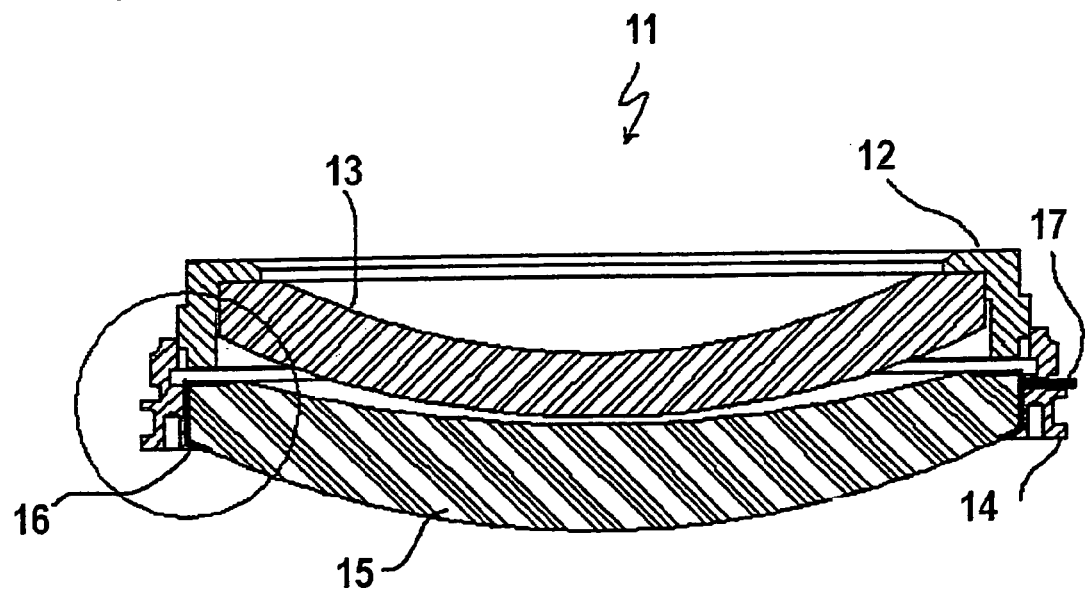
FIG. 5 is a cross-sectional view of a lens module having a heating element according to the second embodiment.
Figure 6:
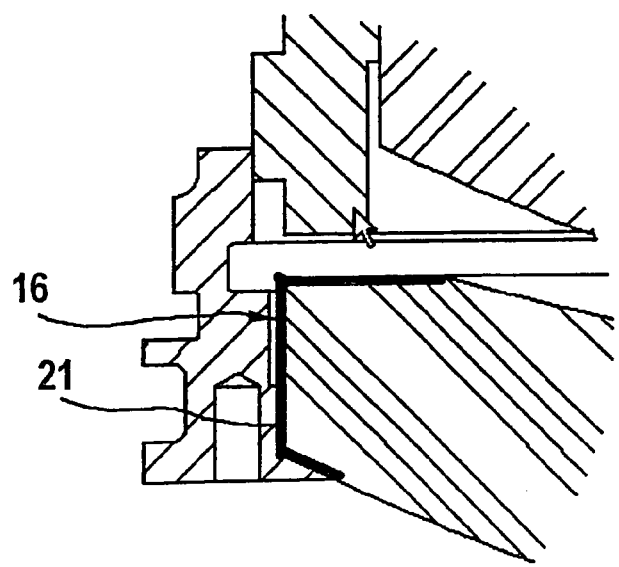
FIG. 6 is a detail of the sectional view of FIG. 5.

As is apparent from FIGS. 5 and 6 a second embodiment of the apparatus for layerwise manufacturing of a three-dimensional object differs from the first embodiment in the formation of the heating element.

According to the second embodiment the heating element 16 is formed from a layer 21 of an electrically conducting material as for example metal, graphite etc., which is formed by vapor deposition or printing on the edge of the exit lens 15, which does not serve for focussing the laser beam 7. Alternatively, also a metal or graphite foil or a carrier foil being coated with a conducting material can be glued onto the edge of the lens.

For increasing the electrical resistance the conducting layer 21 may be structured, for example such that it is formed in the shape of a meander.

This embodiment may be advantageously also applied to lenses having a non-circular rim.

In the above described embodiments connections of the electrical leads 17 to the heating element 16 may for example be accomplished by leading through the cables directly, by crimping or soldering onto cables having a higher mechanical strength in the inner of the lens mount, by contact clamping in the container, etc.

In all embodiments it is possible to control the temperature of the exit lens. This can be effected by measuring the temperature with an additionally provided temperature sensor and a corresponding readjustment of the supplied electrical energy. Alternatively, the temperature dependence of the resistance of the heating element may be used to detect the temperature via a measurement of current and voltage without any additional temperature sensor.

In the above mentioned embodiments the lens module comprises two lenses. However, alternatively also lens modules having only one lens or having more than two lenses can be used.

In the event that, as in the initially described device, a safety glass is placed in front of the lens in order to prevent a contamination of the lens, the heating element can be also provided for the safety glass in the same. way as it is provided for the lens in the above mentioned embodiments.

In general the invention may be applied to each coupling window that serves for transmitting electromagnetic radiation to a three-dimensional object to be built.

Further, a device may be additionally provided that blows a gas, as for example nitrogen, to the coupling window, as described in the introduction. Compared to the known method in this case the gas supply may be reduced.

Though in the above mentioned embodiments the invention was only explained on the basis of laser sintering, it may be advantageously applied also to other apparatusses for layerwise manufacturing of the three-dimensional object by solidification of a material, which can be solidified by electromagnetic radiation, in which a coupling window for transmitting electromagnetic radiation through the three-dimensional object to be built exists.

The invention claimed is:

1. Apparatus configured to perform layerwise manufacturing of a three-dimensional object by solidification of a building material capable of being solidified by electromagnetic radiation, said apparatus comprising:
   a source of said electromagnetic radiation,
   a building space for manufacturing said three-dimensional object,
   a coupling window adapted to allow for transmitting said electromagnetic radiation into said building space,
   a heating element that heats said coupling window to a temperature sufficient to reduce accumulation on the coupling window of contamination that is generated by action of said electromagnetic radiation on said building material, and
   wherein said coupling window is heated by said heating element during said transmitting of said electromagnetic radiation through said coupling window.

2. The apparatus of claim 1, wherein said coupling window comprises a lens serving for focusing said electromagnetic radiation.

3. The apparatus of claim 1, wherein said coupling window comprises a safety glass.

4. The apparatus of claim 1, wherein said heating element is attached to said coupling window.

5. The apparatus of claim 1, wherein
   said coupling window has an edge and said heating element is formed of a heat-generating wire coiling, which is attached around said edge of said coupling window.

6. The apparatus of claim 1, wherein said heating element is formed of a heat-generating layer of an electrically conducting material, which is vapor deposited or printed at said edge of said coupling window.

7. The apparatus of claim 6, wherein said electrically conducting material is a metal or graphite.

8. The apparatus of claim 1, wherein said heating element is formed of a heat-generating electrically conducting foil, which is applied at said edge of said coupling window.

9. The apparatus of claim 8, wherein said electrically conducting foil is a metal or graphite foil or a carrier foil, which is coated with a conducting material.

10. The apparatus of claim 6, wherein said electrically conducting layer is structured.

11. The apparatus of claim 10, wherein said electrically conducting layer is formed in the shape of a meander.

12. The apparatus of claim 1, wherein said coupling window is held in a mount, said mount has an opening and
   said heating element is attached to electrical leads, which are led to the outside through said opening in said mount.

13. The apparatus of claim 1, wherein the temperature of said coupling window can be controlled.

14. The apparatus of claim 13, wherein said apparatus comprises a temperature sensor and said temperature of said coupling window can be detected via said temperature sensor.

15. The apparatus of claim 13, wherein said temperature of said coupling window can be detected by a measurement of the current and the voltage of said heating element.

16. The apparatus of claim 1, comprising a device for blowing said coupling window with a gas.

17. A method for layerwise manufacturing of a three-dimensional object by solidification of a building material capable of being solidified by electromagnetic radiation, comprising the steps of provinding a building space serving for the manufacturing of said three-dimensional object, providing a source for emitting said electromagnetic radiation, providing a coupling window through which said electromagnetic radiation is transmitted into said building space, and heating said coupling window using a heating element, while transmitting of said electromagnetic radiation through said coupling window for layerwise manufacturing of said three-dimensional object to a temperature sufficient to reduce accumulation on the coupling window of contamination that is generated by action of said electromagnetic radiation on said building material.

18. The method of claim 17, further comprising the step of controlling the temperature of said coupling window.

19. The method of claim 18, further comprising the steps of additionally providing a temperature sensor and detecting the temperature of said coupling window via said temperature sensor.

20. The method of claim 18, further comprising the steps of measuring the current and the voltage of said heating element and detecting the temperature of said coupling window by said measurement of the current and the voltage of said heating element.

21. The method of claim 17, further comprising the step of additionally blowing said coupling window with a gas.

22. The apparatus of claim 8, wherein said electrically conducting foil is structured.

23. The apparatus of claim 22, wherein said electrically conducting foil is formed in the shape of a meander.

24. The apparatus of claim 12, comprising a device for blowing said coupling window with a gas.

25. The method of claim 19, further comprising the step of additionally blowing said coupling window with a gas.

26. The apparatus of claim 1, wherein said building material is a powder and said solidification is carried out by sintering.

27. The apparatus of claim 26, wherein said contamination is formed by volatile decomposition and reaction products from said sintering of said powderized building material.

28. The method of claim 17, wherein said building material is a powder and said solidification is carried out by sintering.

29. The method of claim 28, wherein said contamination is formed by volatile decomposition and reaction products from said sintering of said powderizing building material.

* * * * *